(12) United States Patent
Benham et al.

(10) Patent No.: US 6,194,526 B1
(45) Date of Patent: Feb. 27, 2001

(54) PROCESSES THAT PRODUCE POLYMERS

(75) Inventors: Elizabeth A. Benham; Rhutesh K. Shah; Ashish M. Sukhadia; Joel L. Martin; Max P. McDaniel, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/111,213

(22) Filed: Jul. 7, 1998

(51) Int. Cl.[7] .............................. C08F 4/52; C08F 10/08; C08F 10/14
(52) U.S. Cl. ............... 526/64; 526/124.2; 526/124.3; 526/916; 526/348.4; 526/348.6
(58) Field of Search .................. 526/64, 124.2, 526/124.3, 916, 348.4, 348.6

(56) References Cited

U.S. PATENT DOCUMENTS

| | | | |
|---|---|---|---|
| 4,513,095 | * 4/1985 | Speca | 502/111 |
| 4,605,638 | 8/1986 | Nowlin et al. | 502/104 |
| 4,629,714 | * 12/1986 | Shelly | 502/113 |
| 4,656,151 | * 4/1987 | Shelly et al. | 502/113 |
| 4,672,096 | 6/1987 | Nowlin | 526/116 |
| 4,754,007 | 6/1988 | Pullukat et al. | 526/130 |

* cited by examiner

*Primary Examiner*—David W. Wu
*Assistant Examiner*—R. Rabago
(74) *Attorney, Agent, or Firm*—Richmond, Hitchcock, Fish & Dollar

(57) ABSTRACT

A process to produce a polymer is provided. The process comprises polymerizing monomers wherein the monomers comprise ethylene, 1-butene, and 1-hexene. The total amount of 1-butene and 1-hexene in the polymer is less than 10 mole percent of the polymer, and the mole ratio of 1-butene to 1-hexene is in a range of 4:1 to 9:1. The polymerizing is conducted in a loop reactor under slurry polymerization conditions with a diluent that comprises isobutane, where the isobutane is a majority of the diluent by weight. A catalyst that comprises titanium, magnesium, and halide and a cocatalyst that comprises organoaluminum are utilized. The polymerizing is conducted at a temperature from 73° C. to 85° C. The polymer produced has a heterogeneity index (Mw/Mn) from about 3 to about 7, a density from about 0.915 to about 0.925 grams per cubic centimeter, a melt index from about 0.25 to about 3.5 grams per ten minutes, and a shear ratio from about 24 to about 30.

5 Claims, No Drawings

PROCESSES THAT PRODUCE POLYMERS

FIELD OF THE INVENTION

This invention is related to the field of processes that produce polymers.

BACKGROUND OF THE INVENTION

Billions of pounds of polymers are produced every year. A large part of these polymers comprise ethylene, where said ethylene is a majority of said polymers based on weight (hereafter "ethylene polymers"). A particularly important type of ethylene polymer is called linear, low density, polyethylene (hereafter "LLDPE"). LLDPE is a polymer of ethylene and at least one olefin. This ethylene polymer is especially important in film applications where its unique properties are very useful. LLDPE can be make by several different catalysts, however, it is most preferred when the LLDPE is made from a Ziegler catalyst due to the fact that this catalyst produces a LLDPE that has superior properties.

Currently, there are several commercial processes that produce ethylene polymers. However, each of these processes have certain limitations. For example, one commercial process for producing ethylene polymers is called the slurry process. This process can be conducted in a loop reactor. However, this slurry process conducted in a loop reactor cannot produce all of the ethylene polymers desired. In particular, it cannot produce a LLDPE with a Ziegler catalyst. This is because Ziegler catalysts do not incorporate hexene, or octene, into the polymer very well. Chromium and metallocene catalysts can be used to produce LLDPE in a loop slurry reactor, but these polymers have inferior performance compare to LLDPE's produce from Ziegler catalysts.

Consequently, the inventors provide this invention to solve this problem.

SUMMARY OF THE INVENTION

It is an object of this invention to provide a process that produces LLDPE using a Ziegler catalyst in a loop slurry reactor.

In accordance with this invention a process to produce a polymer is provided. Said process comprises polymerizing monomers to produce said polymer
   wherein said monomers are ethylene, and either 1-butene, 1-hexene, or both, and
   wherein said polymerizing is conducted,
      (1) in a loop reactor,
      (2) under slurry polymerization conditions,
      (3) with a diluent that comprises isobutane, where said isobutane is a majority of said diluent by weight
      (4) with a catalyst that comprises titanium, magnesium, and halide
      (5) with a cocatalyst that comprises organoaluminum;
      (6) at a temperature from 73° C. to 85° C., and
   wherein said polymer has
      (7) a molecular weight distribution from about 3 to about 7,
      (8) a density from about 0.915 to about 0.925 grams per cubic centimeter,
      (9) a melt index from about 0.25 to about 3.5 grams per ten minutes,
      (10) a shear ratio from about 24 to about 34.

These objects, and other objects, will become more apparent to those with ordinary skill in the art by reading this disclosure.

DETAILED DESCRIPTION OF THE INVENTION

This invention claims a process to produce LLDPE by polymerizing monomers to produce polymers.

The monomers used in this invention are ethylene, 1-butene, and 1-hexene. Other olefins such as, for example, 1-pentene, 1-heptene, 3-methyl-1-butene, 3-methyl-1-pentene, 4-methyl-1-pentene, 3-ethyl-1-hexene, and 1-octene can be used. However, it is currently preferred to use ethylene, 1-butene, and 1-hexene.

The polymerizing is conducted, in a loop reactor, under slurry polymerization conditions. The diluent that enters the loop reactor comprises isobutane, where said isobutane is a majority of said diluent by weight. The catalyst (sometimes called "Ziegler-Natta catalyst" or just "Ziegler catalyst") used comprises titanium, magnesium, and halide. The cocatalyst used is an organoaluminum. The polymerization is conducted at a temperature from 73° C. to 85° C. and a pressure from about 400 to about 800 Psia.

Loop reactors are known in the art see, for example, U.S. Pat. Nos. 3,248,179; 4,424,341; 4,501,855; and 4,613,484; the entire disclosures of which are hereby incorporated by reference. Especially preferred processes are disclosed in U.S. Pat. Nos. 4,589,957; 4,737,280; 5,597,892; and 5,575,979 the entire disclosures of which are hereby incorporated by reference. In particular, the use of flash line heaters for better separation of diluent and polymer are described therein.

Slurry polymerization is also known in the art see, for example, the earlier cited U.S. patents.

The diluent, before it enters the reactor, comprises isobutane. Additionally, before the diluent enters the reactor, the majority of said diluent is isobutane. It is preferred when the diluent contains 60–100, more preferably, 70–100, and most preferably 80–100 weight percent isobutane based on the weight of the diluent before it enters the reactor.

The catalysts used in this polymerization comprise titanium, magnesium, and halide. Examples of such catalysts can be found in U.S. Pat. Nos. 5,275,992; 5,237,025; 5,244,990; 5,179,178; the disclosures of which are hereby incorporated by reference. It is important to note that Chromium oxide based catalysts or metallocene catalyst do not have to be present during the polymerization, nor should they be present. These types of catalyst are available commercially. Davison corporation sells XPO-5003, XPO-5005, and XPO-5007 catalysts which can be used in this invention.

The catalyst must be used in the presence of a cocatalyst that comprises organoaluminum.

Organoaluminum compounds have the following general formula.

$$\text{FORMULA TWO: Al}(X^5)_n(X^6)_{3-n}$$

In this formula ($X^5$) is a hydrocarbyl having from 1–20 carbon atoms. Currently, it is preferred when ($X^5$) is an alkyl having from 1 to 10 carbon atoms. However, it is most preferred when ($X^5$) is selected from the group consisting of methyl, ethyl, propyl, butyl, and isobutyl.

In this formula ($X^6$) is a halide, hydride, or alkoxide. Currently, it is preferred when ($X^6$) is independently selected from the group consisting of fluoro and chloro. However, it is most preferred when ($X^6$) is chloro.

In this formula "n" is a number from 1 to 3 inclusive. However, it is preferred when "n" is 3.

Examples of such compounds are as follows:
trimethylaluminum;
triethylaluminum;
tripropylaluminum;
diethylaluminum ethoxide;
tributylaluminum;
triisobutylaluminum hydride;
triisobutylaluminum; and
diethylaluminum chloride.

Currently, triethylaluminum is preferred.

The temperature that the polymerization is conducted at is in the range of 73° C. to 85° C., preferably 75° C. to 80°. Temperatures higher than 85° C. can lead to reactor fouling. Temperatures lower than 73° C. lead to production inefficiencies.

The pressure that the polymerization is conducted at is in the range of about 400 Psia to about 800 Psia, preferably about 500 to about 700.

Ethylene polymers were prepared in a continuous particle form process (a.k.a. Slurry process) by contacting a Ziegler-Natta catalyst with a monomer and at least one comonomer. The polymerization was conducted in a loop reactor that had a volume of 23 gallons (87 liters). The reactor temperature was varied over the range of 73° C. to 85° C. and the pressure was about 4 Mpa (about 580 psi). The diluent was isobutane. The catalyst was XPO-5003. This catalyst is available from the Davison Corporation. The cocatalyst used was triethylaluminum. Hydrogen was used to regulate the molecular weight of the product. The reactor was operated to have a residence time of 1.25 hrs. At steady state conditions, the isobutane feed rate was 46 lbs/hr, the ethylene feed rate was about 30 lbs/hr, and the comonomer feed rate was varied to help control the density of the product polymer. Polymer was removed from the reactor at the rate of 25 lbs/hr.

TABLE-I

| Ex. # | $F^1$ | $P^2$ | $M^3$ | $D^4$ | $MI^5$ | $HLMI^5$ | $HLMI/MI^5$ | $Mw^6$ | $Mn^7$ | $HI^8$ | $MD^9$ | $TD^{10}$ |
|---|---|---|---|---|---|---|---|---|---|---|---|---|
| 1 | 100/0 | 100/0 | 4.32 | 0.9200 | 1.11 | 28.98 | 26.1 | 107 | 26.9 | 4.0 | 140 | 450 |
| 2 | 75/25 | 81/19 | 3.96 | 0.9221 | 1.02 | 27.84 | 27.3 | 113 | 27.3 | 4.1 | 220 | 550 |
| 3 | 75/25 | 79/21 | 4.18 | 0.9199 | 1.15 | 31.74 | 27.6 | 105 | 26.3 | 4.0 | 220 | 550 |
| 4 | 50/50 | 58/42 | 4.13 | 0.9200 | 1.11 | 31.6 | 28.5 | 106 | 25.1 | 4.2 | 260 | 630 |
| 5 | 0/100 | 0/100 | 3.70 | 0.9215 | 1.13 | 37.55 | 33.2 | 113 | 23.3 | 4.8 | 234 | 803 |

The polymer that is produced has a heterogeneity index ($M_w/M_n$) from about 3 to about 7, preferably 3–5. Additionally, the polymer has a density from about 0.915 to about 0.925, preferably 0.918 to 0.923 grams per cubic centimeter. The polymer also has a melt index from about 0.25 to about 3.5, preferably 0.5–1.5, and most preferably 0.7–1.2 grams per ten minutes. The polymer also has a high load melt index from about 20 to about 35, preferably 25–30 grams per ten minutes. The shear ratio (HLMI/MI) is from about 24 about 34, preferably about 24 to about 30, and most preferably 24 to 28. Shear ratios above about 34 start to show bad tear strength properties, shear ratios below about 24, start to decrease the process ability of the polymer.

The polymer when both butene and hexene are used, has a mole ratio of butene to hexene in the range of 1:1 to 95:1, preferably 4:1 to 9:1.

The total amount of 1-butene and 1-hexene in the polymer is less than 10 mole percent of the polymer, preferably less than 7.5 mole percent, even more preferably less than 5 mole percent. However, there should be at least 1 mole percent, preferably at least 2 mole percent, and most preferably at least 3 mole percent.

The polymers produced according to this invention exhibit decreased swelling in the loop reactor during the slurry polymerization. Decreased polymer swelling is advantageous because the loop reactor is less susceptible to fouling during the slurry polymerization process; a polymer with low swell during slurry polymerization usually has a desirable high bulk density; and polymer productivity, expressed as grams of polymer produced per gram of catalyst (g/g), can be increased.

EXAMPLES

These examples provide additional information to a person skilled in the art. These examples are not meant to be construed as limiting the scope of the claims.

Table-I Notes:
1. This is the molar ratio of butene to hexene in the feed stream to the reactor. It is based on the total moles of butene and hexene. This was determined by monitoring and adjusting feed inputs into the reactor.
2. This is the molar ratio of butene to hexene in the polymer. It is based on the total moles of butene and hexene. This was determined by $C^{13}$ NMR.
3. This is the mole percent of butene and hexene found in the polymer. This was determined by $C^{13}$ NMR.
4. This is the density of the polymer in grams per cubic centimeter. This was determined using ASTM D 1505-68 and ASTM D 1928, Condition C. Determined on a compression molded sample, cooled at about 15° C. per minute, and conditioned at room temperature for about 40 hours.
5. The MI is the melt index of the polymer in grams per ten minutes. It was determined using ASTM D 1238. Determined at 190° C. with a 2,160 gram weight. The HLMI is the high load melt index of the polymer in grams per ten minutes. It was determined using ASTM D 1238. Determined at 190° C. with a 21,600 gram weight. The HLMI/MI is the shear ratio.
6. This is the weight average molecular weight. This was determined by size exclusion chromatography (SEC). This method was performed at 140° C. on a Waters, model 150 GPC with a refractive index detector. A solution concentration of 0.25 weight percent in 1,2,4-trichlorobenzene was used.
7. This is the number average molecular weight. This was determined by size exclusion chromatography (SEC). This method was performed at 140° C. on a Waters, model 150 GPC with a refractive index detector. A solution concentration of 0.25 weight percent in 1,2,4-trichlorobenzene was used.
8. This is the heterogeneity index (Mw/Mn).
9. This is the tear strength in the machine direction. This was determined according to ASTM D1922 and is a modification for polymer film adapted from the Elmendorf tear test used for paper. This method determines the average force in grams required to propagate a tear through 2.5" of film in the machine extrusion direction (MD) or transverse direction (TD) as indicated. In all instances, the film was 1 mil thickness.

10. This is the tear strength in the transverse direction. This was determined according to ASTM D 1922 and is a modification for polymer film adapted from the Elmendorf tear test used for paper. This method determines the average force in grams required to propagate a tear through 2.5" of film in the machine extrusion direction (MD) or transverse direction (TD) as indicated. In all instances, the film was 1 mil thickness.

That which is claimed is:

1. A process to produce a polymer said process comprising polymerizing monomers to produce said polymer wherein said monomers comprise ethylene, 1-butene, and 1-hexene;

wherein the total amount of 1-butene and 1-hexene in said polymer is less than 10 mole percent of said polymer;

wherein the mole ratio of 1-butene to 1-hexene in said polymer is in a range of 4:1 to 9:1;

wherein said polymerizing is conducted,
  (1) in a loop reactor,
  (2) under slurry polymerization conditions,
  (3) with a diluent that comprises isobutane, where said isobutane is a majority of said diluent by weight
  (4) with a catalyst that comprises titanium, magnesium, and halide
  (5) with a cocatalyst that comprises organoaluminum;
  (6) at a temperature from 73° C. to 85° C., and wherein said polymer has
  (7) a heterogeneity index (Mw/Mn) from about 3 to about 7,
  (8) a density from about 0.915 to about 0.925 grams per cubic centimeter,
  (9) a melt index from about 0.25 to about 3.5 grams per ten minutes,
  (10) a shear ratio from about 24 to about 30.

2. A process according to claim 1 wherein said organoaluminum is selected from the group consisting of trimethylaluminum, triethylaluminum;

tripropylaluminum;

diethylaluminum ethoxide;

tributylaluminum;

triisobutylaluminum hydride;

triisobutylaluminum;

diethylaluminum chloride, and mixtures thereof.

3. A process according to claim 2 wherein said organoaluminum comprises triethylaluminum.

4. A process according to claim 1 wherein said polymer has a heterogeneity index ($M_w/M_n$) from 3–5, a density from 0.918 to 0.923 grams per cubic centimeter, a melt index from 0.5–1.5, and a shear ratio (HLMI/MI) is from about 24 to about 30.

5. A process according to claim 1 wherein the total amount of 1-butene and 1-hexene in the polymer is less than 7.5 mole percent, and at least 2 mole percent.

* * * * *